(12) United States Patent
Lindsay et al.

(10) Patent No.: US 6,907,503 B2
(45) Date of Patent: Jun. 14, 2005

(54) DUAL PORT RAM COMMUNICATION PROTOCOL

(75) Inventors: Michael R Lindsay, Commerce Township, MI (US); John R Dombrowski, Dearborn Heights, MI (US); David R DeRain, Walled Lake, MI (US); Alan R Ward, Troy, MI (US); Mary Joyce, Farmington Hills, MI (US); Michael D Hesse, Dearborn Heights, MI (US); Madhu B Banerjee, Bloomfield Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 710 days.

(21) Appl. No.: 09/965,490

(22) Filed: Sep. 27, 2001

(65) Prior Publication Data

US 2003/0061300 A1 Mar. 27, 2003

(51) Int. Cl.[7] .............................................. G06F 12/00
(52) U.S. Cl. ...................... 711/149; 711/156; 709/213; 701/115
(58) Field of Search ................................. 711/149, 156, 711/147, 148, 151, 152, 153; 709/213, 214, 215, 216; 701/115

(56) References Cited

U.S. PATENT DOCUMENTS

| 4,706,082 A | 11/1987 | Miesterfeld et al. |
| 4,719,458 A | 1/1988 | Miesterfeld et al. |
| 4,739,324 A | 4/1988 | Miesterfeld et al. |
| 4,742,349 A | 5/1988 | Miesterfeld et al. |
| 5,086,407 A | 2/1992 | McGarity et al. |
| 5,245,705 A | 9/1993 | Swaney |
| 5,448,703 A | 9/1995 | Amini et al. |
| 5,483,660 A | 1/1996 | Yishay et al. |
| 5,490,253 A | 2/1996 | Laha et al. |
| 5,550,804 A | 8/1996 | Haussler et al. |
| 5,611,053 A | 3/1997 | Wu et al. |
| 5,649,125 A | 7/1997 | Tietjen et al. |
| 5,729,762 A | 3/1998 | Kardach et al. |
| 5,761,443 A | 6/1998 | Kranich |
| 5,898,848 A | 4/1999 | Gulick |
| 5,951,659 A | 9/1999 | McElroy et al. |
| 5,960,466 A | 9/1999 | Belgard |
| 6,032,178 A | 2/2000 | Bacigalupo et al. |
| 6,098,136 A | 8/2000 | Okazawa et al. |
| 6,621,269 B2 * | 9/2003 | Ward et al. .................. 324/388 |
| 6,823,441 B1 * | 11/2004 | Ward et al. .................. 711/211 |

* cited by examiner

Primary Examiner—Reginald G. Bragdon
(74) Attorney, Agent, or Firm—Ralph E. Smith (57) ABSTRACT

An apparatus for determining the validity of a data signal communicated between two microprocessors by a dual port RAM includes a sender for providing a data signal and an initialization status indicator and a dual port RAM in communication with the sender for receiving the data signal and the initialization status indicator. The RAM has a first location for storing the data signal and a second location for storing the initialization status indicator. The sender performs initialization on the RAM at the beginning of a data transfer cycle which includes a plurality of data transfer from the sender to a receiver. The sender updates the initialization status indicator as the initialization progresses. The receiver reads the initialization status of the RAM from the second location and subsequently reads the data signal from the first location in association with the initialization status of the RAM.

18 Claims, 4 Drawing Sheets

DUAL PORT RAM COMMUNICATION PROTOCOL

BACKGROUND OF THE INVENTION

1. Technical Field

The present invention relates generally to a memory circuit for a vehicle communication system. More particularly, the invention relates to communication protocol for a dual port memory architecture which allows information exchange between two vehicle microprocessors.

2. Background and Summary of the Invention

Most dual port random access memory (RAM) devices simply allow data transfer between two microprocessors. The data is transferred by one microprocessor writing data across a shared parallel data bus that another microprocessor then reads. In effect, the dual port RAM acts as a shared memory array between the two microprocessors. This is sufficient for those applications in which each dual port RAM location is used as a standard RAM location. However, like anything else, this has its limitations. For example, certain applications require the microprocessors to know the validity of the data stored in a dual port RAM location prior to using the data. Similarly, a microprocessor which is about to write data to a dual port RAM address needs to know whether the other microprocessor has read the previously stored data in the associated location prior to overwriting and destroying data currently in that location. Naturally, the associated microprocessors could be used to keep track of the interchange of data so that it was known whether the data was current, and whether or not it had been read. This too has limitations. The problem with this additional processing is that when large amounts of data are being transferred between the microprocessors, the overhead associated with management of the dual port RAM becomes complex and time consuming. At some point, this renders microprocessor managed dual port RAM unusable in applications where speed is required.

One such application which requires speed in order to offer additional features is disclosed in U.S. patent application Ser. No. 09/839,275, entitled "Dual Port RAM with Automatic Write Indicators," (Ward et al, assigned to the same assignee, filed Apr. 20, 2001, now abandoned). The application entitled "Dual Port RAM with Automatic Write Indicators" is directed to the sharing of data between a microprocessor used for engine management and a microprocessor used to electronically control an automatic transmission in an automobile. To thoroughly discuss how the above patent application and the present invention operate, several definitions are helpful. A "sender" refers to a microprocessor which writes data into the dual port RAM. A "receiver" refers to a microprocessor which reads data out of the dual port RAM that was placed in memory by the sender. The dual port RAM reserves two blocks of memory locations to provide communication between two microprocessors. Each block of the memory location is readable by both sender and receiver, but writable only by the sender. Specifically, a first memory location is writable only by the first microprocessor and readable by both the first and second microprocessors. A second memory location is writable only by the second microprocessor and readable by both microprocessors.

In the above mentioned patent application, status indicators or flags are used to share data between two microprocessors so as to eliminate microprocessor burdens and to provide high speed data transfer. The status indicators or flags allow a microprocessor, which reads data out of the dual port RAM, to determine whether the data to be read is current or not. It also allows a microprocessor, which writes data to the dual port RAM, to determine whether the other microprocessor has read data in the location it is about to write. By determining the validity of data, the dual port RAM prevents the overwriting and loss of data.

More specifically, when a write to a first address of the dual port RAM occurs, a write flag corresponding to the first address is placed in its associated register that is visible to both microprocessors. This write flag indicates to the receiving microprocessor that the data in the first address has been updated since the write flag was last cleared. The receiving microprocessor can then clear this flag by reading the data in the first address and clearing the flag in the associated register. Thus, the microprocessor, which reads data from the dual port RAM, knows that the stored data is current.

Similarly, the sender can also use the write flag. More particularly, the sender examines the write flag prior to writing data to a second address. If the flag has not been cleared, the sender knows that the receiver has not read the data and the data could be destroyed by overwriting. However, if the flag has been cleared, the sender knows that the data has been read and that it is safe to re-write new data to that address. Thus, a microprocessor knows whether the other microprocessor has read the data in the second address prior to overwriting and destroying data currently in the second address.

The readability of the write indicator flags by both microprocessors of the dual port RAM enables the receiver to know when new data has been written to the RAM location since it was last read (the flag is set). It also enables the sender to know when the data written to a RAM location has been utilized by the receiving side (the flag is clear) so that it can take appropriate actions. For example, if one microprocessor were to use the dual port RAM plus the other microprocessor as an expensive port expansion device, then the sending microprocessor would place data in the dual port RAM where the receiving microprocessor is expected to read out and place the value(s) on its port. The receiver would know it has new data in the dual port RAM by reading the write flag asserted by the dual port RAM state machine. The receiver would then read this data out, place the data on its own port pins, then clear the write flag. This lets the sender know that the data has been put out on the port pins. It, in effect, has confirmation that its actions have taken effect in the other microprocessor.

Although this type of communication protocol is successful for providing data transfer between two microprocessors at high speed, improvements can be made. For example, an initialization is typically performed on the dual port RAM by a sender when the system is turned on within which the dual port RAM operates. However, a receiver may retrieve data from the dual port RAM regardless of the initialization status of the dual port RAM when the sender and receiver communicate asynchronously. More particularly, the dual port RAM may not contain valid data when it is prior to initialization, or when the initialization is in progress. In such instances, the receiver may retrieve invalid data and lead to erroneous results.

What is needed is an indicator mechanism that allows to determine the validity of data communicated between two microprocessors using a dual port RAM. Accordingly, it is an object of the present invention to provide an indicator mechanism for a receiver to determine the validity of data communicated by monitoring various initialization and operational statuses of the sender. It is another object of the present invention to provide an indicator mechanism that ensures fast and accurate communication with the use of a dual port RAM.

SUMMARY OF THE INVENTION

In accordance with the teachings of the present invention, an indicator mechanism is provided for determining the validity of information communicated between two microprocessors using a dual port random access memory (RAM). The mechanism includes a sender for providing a data signal and a dual port RAM for receiving the data signal from the sender. The sender writes the data signal to a first memory location in the dual port RAM and an initialization status of the sender to a second memory location of the dual port RAM. The mechanism also includes a receiver for reading the initialization status of the sender from the second memory location of the dual port RAM. The receiver subsequently reads the data signal from the first memory location of the dual port RAM in association with the initialization status of the sender.

It should be understood that both the foregoing general description and the following detailed description are merely exemplary of the invention, and are intended to provide an overview or framework for understanding the nature and characteristic of the invention as it is claimed. The accompanying drawings are included to provide a further understanding of the invention, and are incorporated in and constitute a part of this specification. The drawings illustrate various features and embodiments of the invention, and together with the description serve to explain the principles and operations of the invention.

BRIEF DESCRIPTION OF THE DRAWINGS

Additional objects, advantages, and features of the present invention will become apparent from the following description and appended claims, taken in conjunction with the accompanying drawings in which:

DETAILED DESCRIPTION OF THE PREFERRED EMBODIMENT

Figure 1:
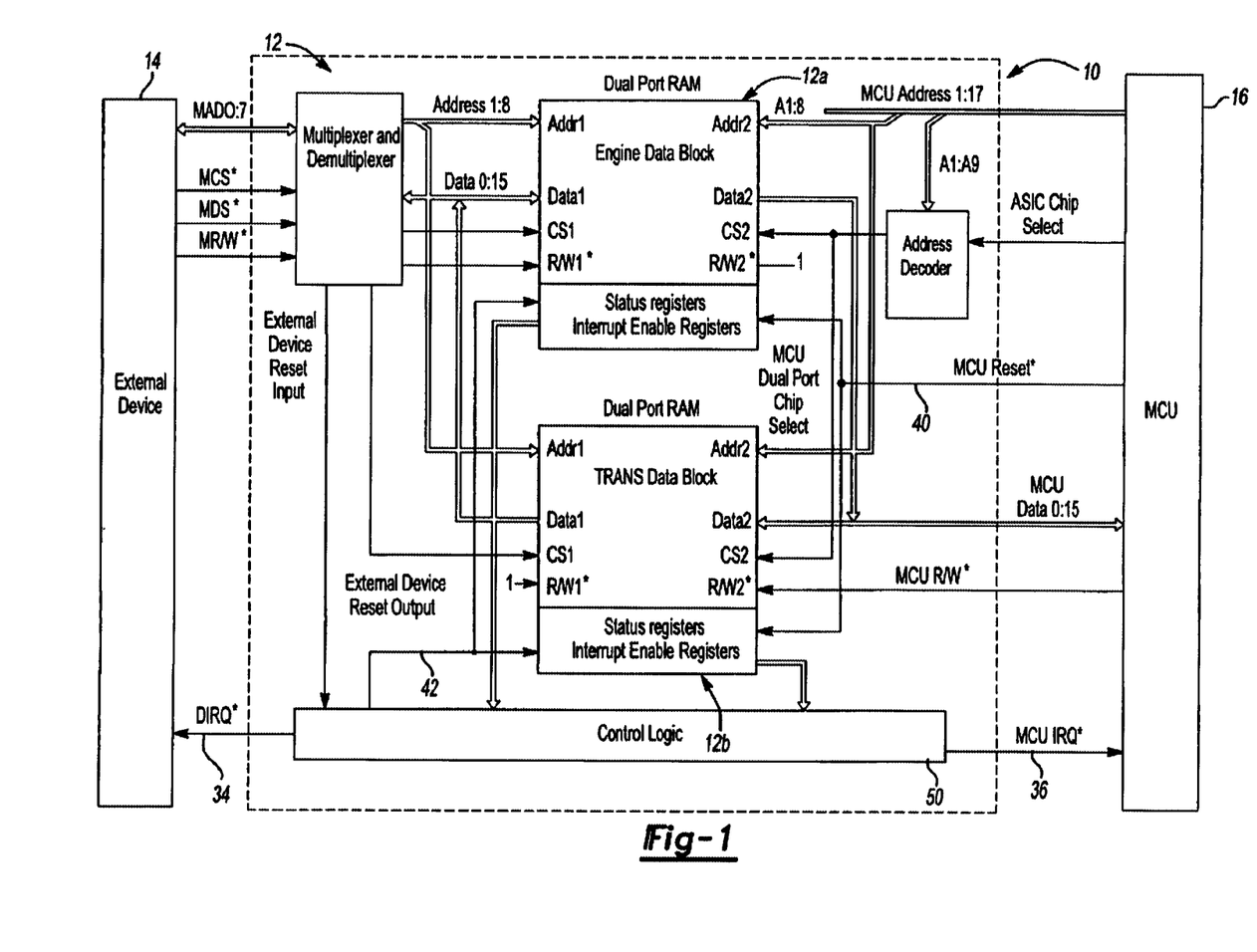
FIG. 1 is a block diagram of the dual port RAM, in accordance with the present invention.

With reference to FIG. 1, a dual port RAM structure 10, according to the present invention, will now be described. The dual port RAM structure 10 includes a 128-word array of dual port RAM 12, which is divided into two separate 64-word addressable blocks. One of the two addressable blocks is an engine data block 12A which is read/writable by an engine control unit 14 and read-only by the transmission control unit 16. The other addressable block is a transmission data block 12B which is read-only by the engine control unit 14 and read/writable by the transmission control unit 16.

Figure 2:
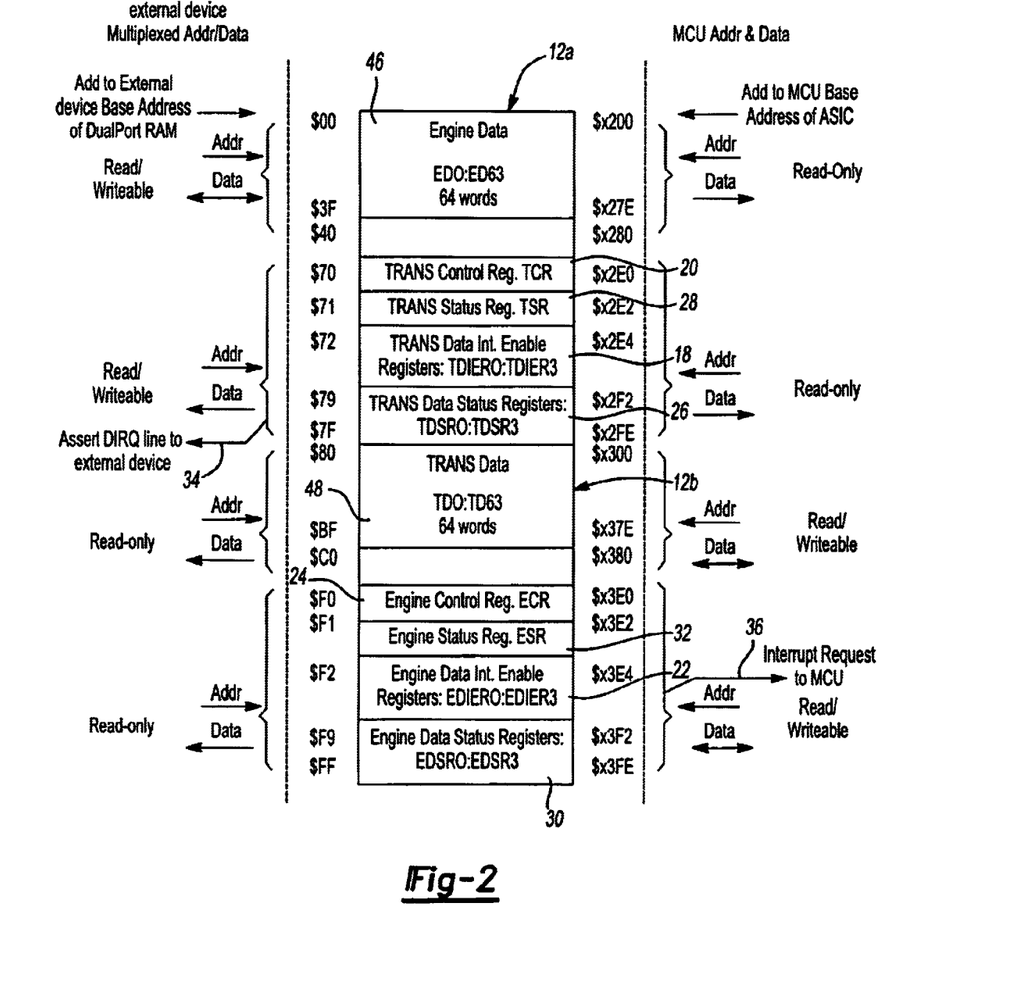
FIG. 2 is a block diagram of the dual port RAM address space, in accordance with the present invention.

As shown in FIG. 2, the dual port RAM 12 includes a plurality of control registers. More particularly, the engine data block 12A includes transmission data interrupt enable registers 18 (TDIER0:TDIER3) and a transmission control register 20 (TCR), each of which is read/writable by the engine control unit 14 and read-only by the transmission control unit 16. Likewise, the transmission data block 12B includes engine data interrupt enable registers 22 (EDIER0:EDIER3) and an engine control register 24 (ECR), each of which is read-writable by the transmission control unit 16 and read-only by the engine control unit 14.

The dual port RAM 12 also includes a plurality of status registers. Specifically, the engine data block 12A includes transmission data status registers 26 (TDSR0:TDSR3) and a transmission status register 28 (TSR), each of which is read/writable by the engine control unit 14 and read-only by the transmission control unit 16. Likewise, the transmission data block includes engine data status registers 30 (EDSR0:EDSR3) and an engine status register 32 (ESR), each of which is read/writable by the transmission control unit 16 and read-only by the engine control unit 14.

The dual port RAM 12 has a capability of generating an interrupt request to the engine control unit 14 and the transmission control unit 16. An engine control unit interrupt request line 34 may signal the engine control unit 14 upon one or more writes to the transmission data block 12B from the transmission control unit 16. The engine control unit interrupt request line 34 may also signal the engine control unit 14 when a transmission control unit reset has occurred. The dual port RAM 12 can also signal the transmission control unit 16 via a transmission control unit interrupt request line 36 upon one or more writes to the engine data block 12A from the engine control unit 14. The transmission control unit interrupt request line 36 also signals the transmission control unit 16 when an engine control unit reset has occurred. The interrupt request is optional, and is controlled by its respective interrupt enable registers 18 (TDIER0:TDIER3) or 22 (EDIER0:EDIER3).

The dual port RAM 12 further includes reset signal lines for the engine and transmission control units 14 and 16, respectively. The transmission control unit 16 is reset by a signal received by a transmission control unit reset 40. When a reset is received, the transmission control unit reset 40 clears the engine data status registers 30 (EDSR0:EDSR3), the engine data interrupt enable registers 22 (EDIER0:EDIER3) and the engine control register 24 (ECR). In addition, the transmission control unit reset 40 sets a transmission reset bit in the transmission status register 28 (TSR) to inform the engine control unit 14 of the reset from the transmission control unit 16. The transmission reset bit is held at logical one for the duration of the transmission control unit reset 40 and stays at logical one until the transmission reset bit is cleared by the engine control unit 14.

Similarly, the engine control unit 14 is reset by a signal received by an engine control unit reset 42. When a reset is received, the engine control unit reset 42 clears the transmission data status register 26 (TDSR0:TDSR3), the transmission data interrupt enable registers 18 (TDIER0:TDIER3) and the transmission control register 20 (TCR). In addition, the engine control unit reset 42 sets an engine reset bit in the engine status register 32 (ESR) to inform the transmission control unit 16 of the reset from the engine control unit 14. The engine reset bit is held at logic one for the duration of the engine control unit reset 42 and stays at logical one until the engine reset bit is cleared by the transmission control unit 16.

The engine data block 12A of the dual port RAM 12 further includes engine data registers 46 (ED0:ED63), which are 64 word-wide RAM registers. Such RAM registers 46 are read/writable by the engine control unit 14 and read-only by the transmission control unit 16. The engine data registers 46 (ED0:ED63) are full dual port RAMs with no component level hardware or software arbitrary logic required to access these memory locations. The transmission data block 12B of the dual port RAM 12 also includes transmission data registers 48 (TD0:TD63), which are 64 word-wide RAM registers. Such RAM registers 48 are read/writable by the transmission control unit 16 and read-only by the engine control unit 14. They are also full dual port RAMs with no component level hardware or software arbitrary logic required to access these memory locations.

The engine data status registers 30 (EDSR0:EDSR3) contain four 16-bit engine data status registers. These registers 30 are readable by engine control unit 14 and transmission control unit 16, and only writes of a logical one by the transmission control unit 16 have an effect on the registers 30. Sixty-four bits of the engine data status registers 30 are denoted as SED0:SED63 and represent the statuses of the engine data registers 46. For example, bits defined as SED0:SED63 represent statuses for ED0 to ED63. The bits SED0:SED63 in the engine data status registers 30 (EDSR0:EDSR3) are set by occurrences of write operations from the engine control unit 14 to the engine data registers 46 (ED0:ED63) respectively. A logical one in each single bit of the engine data status registers 30 (EDSR0:EDSR3) signals that a write operation to its associated engine data register 46 has occurred. The bits SED0:SED63 can only be cleared by writing a logical one to its associated bit location by the transmission control unit 16. Writes of a logical zero by the transmission control unit 14 to the status bits SED0:SED63 have no effect. Each status bit (SED0:SED63) in the engine data status registers (EDSR0:EDSR3) is set at logical one if a write operation has occurred to the associated engine data register 46 (ED0:ED63) by the engine control unit 14 since the status bit was last cleared. A logical zero (0) in the status bit (SED0:SED63) indicates that no write operation to the associated engine data register 46 has occurred since the status bit was last cleared.

The transmission data status registers 26 (TDSR0:TDSR3) contain four 16-bit transmission data status registers. These registers 26 are readable by the engine control unit 14 and the transmission control unit 16, and only writes of a logical one by the engine control unit 14 have an effect on the registers 26. Sixty-four bits within the transmission data status registers 26 are denoted as STD0:STD63, and represent the statuses of the transmission data registers 48 (TD0:TD63). The bits STD0:STD63 are set by occurrences of write operations to the transmission data registers 48 from the transmission control unit 16. A logical one in each single bit of the transmission data status registers 26 (TDSR0:TDSR3) signals that a write operation to its associated transmission data register 48 has occurred. The bits STD0:STD63 can only be cleared by writing a logical one to the bit location by the engine control unit 14. Writes of a logical zero by the engine control unit 14 to status bits (STD0:STD63) have no effect. Each status bit (STD0:STD63) in the transmission data status registers 26 (TDSR0:TDSR3) is set at logical one if a write operation has occurred to the associated transmission data register 48 (TD0:TD63) by the transmission control unit since the status bit was last cleared. A logical zero in the status bit (STD0:STD63) indicates that no write to the associated transmission data register has occurred since the status bit was last cleared.

The transmission status register 28 (TSR) is a single 16-bit register containing the status of the transmission control unit 16. The transmission data interrupt enable registers 18 (TDIER0:TDIER3) are four 16-bit transmission interrupt enable control registers. The transmission control register 20 (TCR) is a single 16-bit transmission control register. All of these registers 28, 18 and 20 are readable/writable by the engine control unit 14 and read-only by the transmission control unit 16.

Similarly, the engine status register 32 (ESR) is a single 16-bit register containing the status of the engine control unit 14. The engine data interrupt enable registers 22 (EDIER0:EDIER3) are four 16-bit engine interrupt enable control registers. The engine control register 24 (ECR) is a single 16-bit engine control register. All of these registers 32, 22 and 24 are readable/writable by the transmission control unit 16 and read-only by the engine control unit 14.

The control logic state machine 50 in the dual port RAM 10 looks for write commands from either the engine side 12A or the transmission side 12B of the dual port RAM 12. The state machine 50 then sets a write flag indicator in an appropriate status register 26 or 30 when a valid write into a dual port RAM register occurs. Both controllers 14 and 16 have access to the write flag indicators to check whether they are set or clear.

The method of providing automatic write indicators is versatile and supports a number of different protocols. For example, for purposes of data paging, the write flag of the last set of a string of data pieces is monitored and cleared by the microprocessors. The sending side (microprocessor) places data in the RAM, while the receiving side looks for the write flag of the last data piece to get set. When set, the receiving side reads the entire string of data pieces, then clears the write flag indicator of the last data piece only. The sending side sees that the write flag is cleared, so it knows that the receiving side has read that information. The sending side then updates the contents of the RAM register. The automatic flag indicators allow for a looser tie between the microprocessors and how they handle their dual port RAM functions. Since multiple data pieces may be handled by different portions of the software, the receiving side does not clear the write indicator flag until it has fully processed the incoming data.

Furthermore, an INIT_STATUS memory location is reserved in dual port RAM to keep track of initialization status. When a voltage is first applied to the dual port RAM structure 10, the dual port RAM 12 powers up in an unknown or random state. The dual port RAM 12 stays in that state until the dual port RAM 12 is initialized. Thus, the sender performs initialization on the dual port RAM 12 whenever the sender comes out of "reset" in accordance with the preferred embodiment of the present invention. The initialization status is traced as the sender performs the initialization on the dual port RAM 12. The initialization status represents the operational status of the sender to the receiver of the dual port RAM 12 as well as the validity of data to be communicated therebetween.

Figure 3:
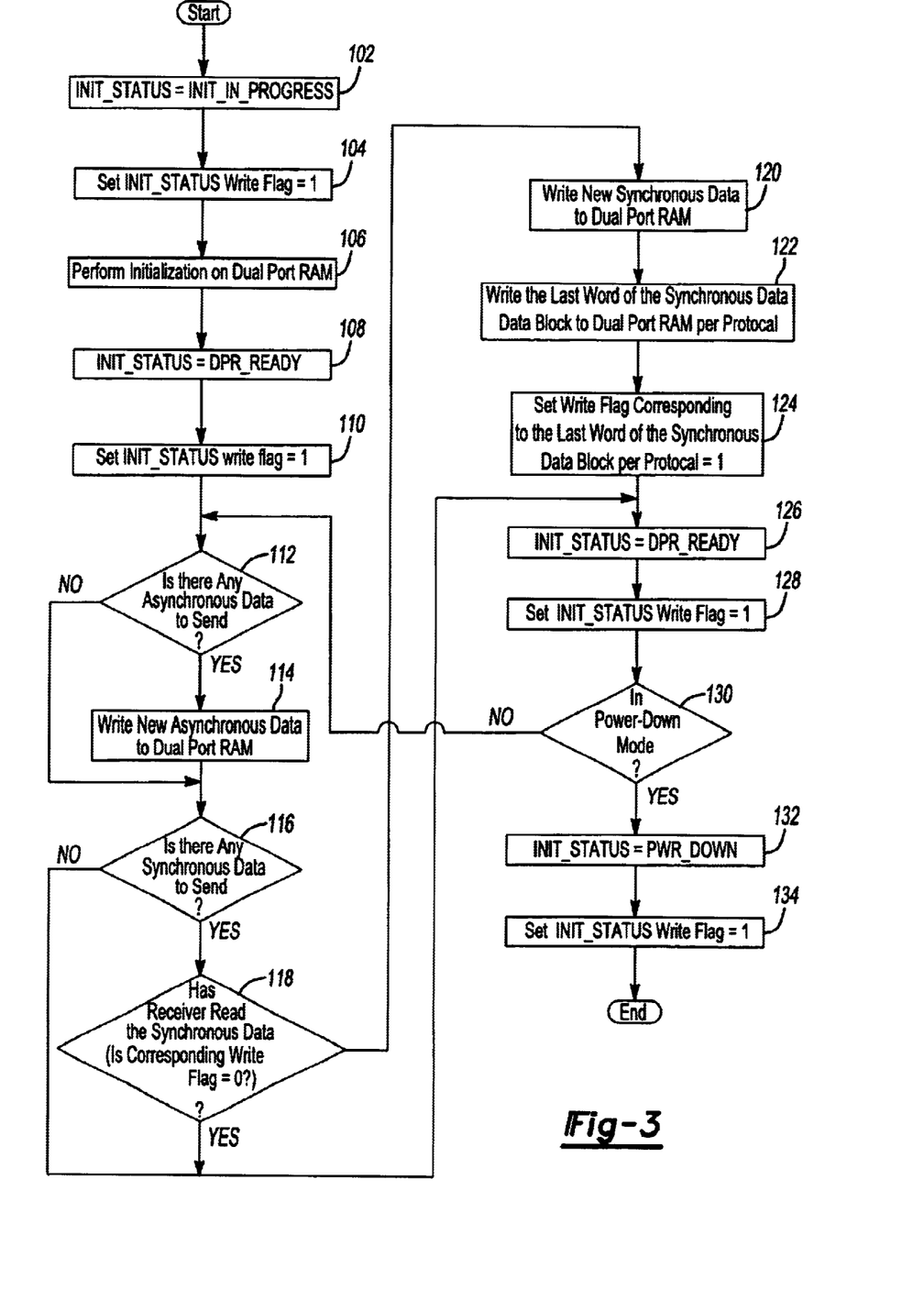
FIG. 3 is a flowchart diagram depicting the method for providing communication between a sender and the dual port RAM, in accordance with the present invention.

FIG. 3 illustrates a method for a sender to provide communication between the sender and the dual port RAM, in accordance with the present invention. In the preferred embodiment of the present invention, when the sender comes out of the reset state, the sender writes a value INIT_IN_PROGRESS to the INIT_STATUS memory location at step 102. The INIT_IN_PROGRESS state indicates that the sender is currently performing initialization on the dual port RAM, and the dual port RAM has not yet been initialized. When the INIT_STATUS memory location is updated, a write flag which corresponds to the INIT_STATUS memory location is set to a logical one at step 104. The logical one value of the write flag, which corresponds to the INIT_STATUS memory location, indicates to the receiver that the INIT_STATUS memory location has new data stored in it.

After the status of initialization is updated, the sender continues to perform initialization on the dual port RAM at step 106. When the sender completes initialization, the sender then writes a value DPR_READY to the INIT_STATUS location at step 108. The DPR_READY state indicates that the sender has completed the initialization and also indicates that it is safe for the receiver to use the dual port RAM data. When the INIT_STATUS location is given the DPR_READY value, the sender updates the write flag corresponding to the INIT_STATUS location at step 110. Specifically, the sender sets the write flag corresponding to the INIT_STATUS memory location at a logical one as the sender completes the initialization on the dual port RAM. By observing the write flag being set at a logical one, the receiver can recognize that the sender is functioning, and that the dual port RAM contains valid data to be retrieved. The receiver may also determine the age of the data that is stored in the dual port RAM by observing the write flag being set.

After initialization of the dual port RAM is completed, the sender writes data signals to appropriate locations of the dual port RAM. In the preferred embodiment of the present invention, the communication protocol uses a write flag for handshake or semaphore purposes as described above. Each dual port RAM location (including the INIT_STATUS memory location) has a corresponding write flag, which is set when the dual port RAM location is updated. The write flags, which correspond to such locations containing data signals, get set at a logical one at the end of every dual port RAM update. These write flags are cleared when the data signals are read by the receiver, which will be described below in greater detail. The transfer of data signals from the sender to the dual port RAM is provided until the power off state is detected.

More specifically, after the initialization has been completed, the sender determines if there is any asynchronous data to be sent at step 112. The present invention allows communication for two data types; namely asynchronous and synchronous. Asynchronous data refers to data in one or more dual port RAM words that have no dependencies on the other memory location. Specifically, data words that are not dependent on any other data words within the dual port RAM are transferred asynchronously. Asynchronous data words can exist in any part of the dual port RAM memory map. In the preferred embodiment of the present invention, asynchronous data includes the INIT_STATUS location, its write flag, the RESET status flag, etc. New asynchronous data is written to the dual port RAM at step 114.

The sender, then, determines if there is any synchronous data to be sent at step 116. Synchronous data refers to two or more dual port RAM words that are dependent on each other for proper interpretation. Synchronous data requires that all elements of data are present prior to receiving and processing it. In the present invention, a semaphore mechanism (write flag) provides the synchronous data transfer. Specifically, a receiving side cannot read data until the write flag has been written by the sender, and the sender cannot write new data until the data has been read by the receiver. The synchronous data occupies two or more dual port RAM words and may be located anywhere in the dual port RAM map. A dual port RAM word of a synchronous block acts as the data transfer semaphore, and the write flag corresponding to the dual port RAM word is the actual semaphore mechanism. The receiver of the data must ensure that the dual port RAM initialization status indicates whether the sender is up, running and updating the dual port RAM.

More specifically, the sender conforms to certain criteria in order to send synchronous data to the dual port RAM. The sender can only update the synchronous dual port RAM words if the write flag corresponding to the chosen semaphore word has been cleared by the receiver. Thus, the sender subsequently determines if the receiver has read the synchronous data previously stored in a given RAM location by inspecting its corresponding write flag at step 118. If the write flag corresponding to the desired RAM location is set at a logical one, the sender cannot update the synchronous dual port RAM words. Thus, the sender goes to step 126 and writes a value DPR_READY to the INIT_STATUS location. The sender then updates the write flag corresponding to the INIT_STATUS location at step 128, and repeats steps 112–130 depending on whether the sender is entering a POWER_DOWN mode.

If the write flag is set at a logical zero, the sender can recognize that the receiver has read the synchronous data previously stored in the desired RAM location and updates the memory location with new synchronous data. When the sender updates the dual port RAM locations with new synchronous data, the sender carries on the write function in a given order. First, the sender writes new synchronous data to the corresponding dual port RAM at step 120. Second, the sender writes the last word of the synchronous data block to the dual port RAM per protocol at step 122. As described above, the synchronous data refers to two or more dual port RAM words that are dependent on each other for proper interpretation. In accordance with the present invention, only the semaphore word corresponding to the last word of the synchronous data block is set to a logical one at step 124 after all words within the synchronous data block have been written at steps 120–122. The semaphore word having a logical one indicates that the RAM words are new and each word of the synchronous data block has been newly written.

When the sender completes the write operation to the dual port RAM, the sender then writes a value DPR_READY to the INIT_STATUS location at step 126. The DPR_READY state indicates that the sender has recently updated the dual port RAM, and data stored in the dual port RAM is now ready to be retrieved. When the INIT_STATUS location is given the DPR_READY value, the sender again updates the write flag corresponding to the INIT_STATUS location at step 128. The sender sets the write flag corresponding to the INIT_STATUS memory location at a logical one as the sender completes the write operation on the dual port RAM. By observing the write flag being set at a logical one, the receiver can recognize that the sender has written new data into the dual port RAM. The receiver may also determine the age of the data that is stored in the dual port RAM by observing the write flag being set.

After the sender updates the write flag corresponding to the INIT_STATUS memory location, the sender then determines if it is entering a power-down mode at step 130. If the sender is not entering a power-down mode, the sender continues updating the dual port RAM by returning to step 112. When the sender enters its power down mode, however, the sender writes the value PWR_DOWN to the INIT_STATUS location at step 132. The PWR_DOWN state indicates that the sender is entering a power off state and is ceasing the operation. The PWR_DOWN state also indicates that the sender is halting the update of the dual port RAM. At any time during the operation of the communication protocol, the data transfer between the sender and the dual port RAM is interrupted when the PWR_DOWN state is detected. When the INIT_STATUS location is set to PWR_DOWN state, the sender writes a logical one to the write flag corresponding to the INIT_STATUS location at step 134, and then ceases operation.

Figure 4:
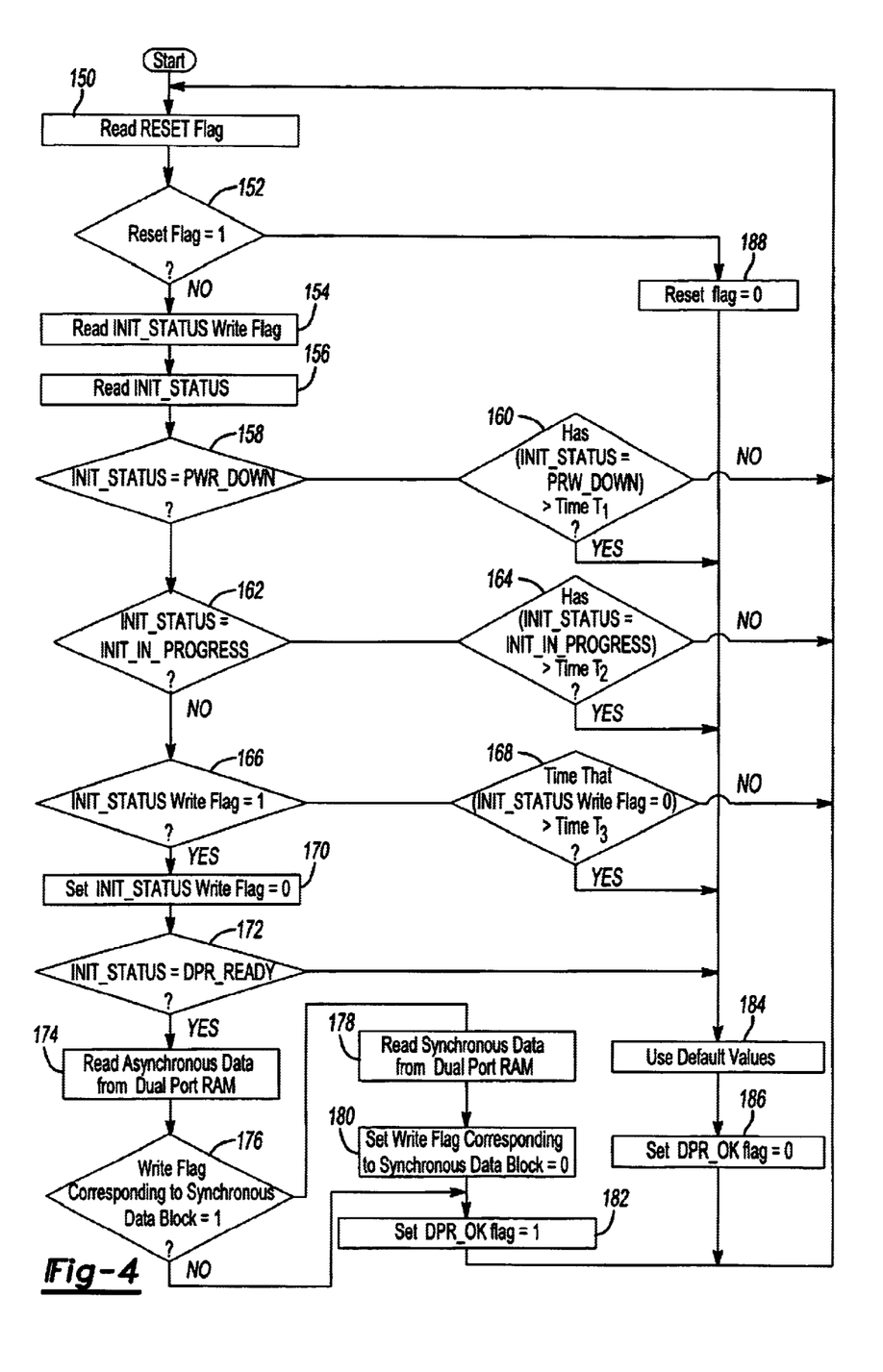
FIG. 4 is a flowchart diagram depicting the method for providing communication between a receiver and the dual port RAM illustrated in FIG. 1, in accordance with the present invention.

FIG. 4 illustrates an indicator mechanism for a receiver to determine the validity of information communicated between two microprocessors using a dual port RAM, in accordance with the present invention. At step 150, the receiver monitors the sender's reset status when the receiver is prompted to read data from the dual port RAM. More specifically, the receiver reads the reset status flag. When the receiver detects the reset flag being set at a logical one at step 152, the receiver clears the reset flag by setting it to a logical zero at step 188. In the preferred embodiment of the present invention, the receiver then uses default values for the dual port RAM data at step 184 because the sender is no longer updating the dual port RAM. By using the default values, the present invention prevents the use of corrupted dual port RAM data which may occur when the sender experiences a watchdog reset. The receiver also sets a DPR_OK flag to a logical zero to indicate to the software algorithms that use the dual port RAM data that the receiver is in the reset mode, step 186. In accordance with the present invention, the receiver continues to use default values until the sender indicates that it is operational and updating the dual port RAM by repeating steps 150–152 and 188. It should be understood that the receiver is not limited to the use of default values when the receiver detects reset flag being set. The receiver may choose to use other data such as old data saved in the dual port RAM from the previous run.

If the receiver detects the reset flag being set at a logical zero at step 152, the receiver monitors the status of the write flag corresponding to the INIT_STATUS memory location at step 154. Subsequently, the receiver reads the status of the INIT_STATUS memory location at step 156. The status of the INIT_STATUS and its corresponding write flag determine whether data, which the receiver is to retrieve from the dual port RAM, is valid or not. In accordance with the present invention, the INIT_STATUS memory location may have four different values and the reset status flag may have two different states. The following table summarizes the possible INIT_STATUS location values and the RESET status flag states.

| INITIALIZATION STATUS (INIT_STATUS) | |
|---|---|
| DATA | DESCRIPTION |
| (Does not contain the following values: (INIT_IN_PROGRESS or DPR_READY or PWR_DOWN)) or (RESET = 1) | The sender's dual port RAM is not initialized (sender may be in reset) |
| INIT_IN_PROGRESS & (RESET = 0) | The sender is initializing dual port RAM (the sender's dual port RAM does not contain valid data) |
| DPR_READY & (RESET = 0) | The sender has completed the initialization of dual port RAM and the sender is functioning (the sender's dual port RAM contains valid data) |
| PWR_DOWN & (RESET = 0) | The sender is in power-down mode (the sender is not updating dual port RAM) |

More specifically, the receiver determines whether the sender is in PWR_DOWN mode at step 158. If the sender is in the PWR_DOWN mode, the receiver determines whether the INIT_STATUS memory location has contained the PWR_DOWN value for longer than a first predetermined time, T1, at step 160. The first predetermined time is defined as the delay time before the receiver uses default values. The first predetermined time must be greater or equal to the delay time the dual port RAM takes to get a first set of real data when the sender is turned on. In accordance with the present invention, the first predetermined time is set at 500 milliseconds (ms). If the INIT_STATUS memory location has contained the PWR_DOWN value for longer than T1, the receiver uses default values at step 184 and sets DPR_OK flag to a logical zero at step 186. Alternatively, the receiver may also maintain the previous dual port RAM data or the previously received and saved data from the sender. Otherwise, the receiver begins a new run by returning to step 150. By providing a window of time before using default values, the receiver provides the dual port RAM robustness.

If the INIT_STATUS memory location does not contain the value of PWR_DOWN at step 158, the receiver determines if the value contained in the INIT_STATUS memory location is INIT_IN_PROGRESS at step 162. If the sender is in INIT_IN_PROGRESS mode, the receiver then determines whether the INIT_STATUS memory location has contained the value of INIT_IN_PROGRESS for longer than a second predetermined time, T2, at step 164. The second predetermined time, T2, is defined as the worst possible time it takes to initialize the dual port RAM. In accordance with the present invention, the second predetermined time, T2, is set at 500 milliseconds (ms). If the INIT_STATUS memory location has contained the value of INIT_IN_PROGRESS for longer than T2, the receiver uses default values at step 184 and sets DPR_OK flag to a logical zero at step 186. Alternatively, the receiver may also maintain the previous dual port RAM data or the previously received and saved data from the sender. Otherwise, the receiver begins a new run by returning to step 150. Again, the receiver provides the dual port RAM robustness by providing a window of time before using the default values.

If the value contained in the INIT_STATUS memory location is neither POWER_DOWN nor INIT_IN_PROGRESS as determined at steps 158 and 162, the receiver determines if the write flag corresponding to the INIT_STATUS memory location is set at a logical one at step 166. If the write flag corresponding to the INIT_STATUS memory location is set at a logical zero, then it is determined if the INIT-STATUS write flag has remained at zero for longer than a third predetermined period, T3, at step 168. The third predetermined period, T3, represents the worst case time period for transferring data between the receiver and the sender. In accordance with the present invention, T3 is set at 500 milliseconds (ms). If the write flag corresponding to the INIT_STATUS memory location has been set at a logical zero for longer than T3, the receiver uses default values at step 184 and sets DPR_OK flag to a logical zero at step 186. Alternatively, the receiver may also maintain the previous dual port RAM data or the previously received and saved data from the sender. Otherwise, the receiver begins a new run by returning to step 150. This also increases the robustness of the dual port RAM by providing a window of time before using the default values. T1, T2 and T3 are set to the longest possible periods, so that the system minimizes the use of default values.

On contrary, if the write flag corresponding to the INIT_STATUS memory location is set at a logical one when determined at step 166, the receiver sets the write flag corresponding to the INIT_STATUS memory location to a logical zero at step 170. By resetting the write flag, the receiver indicates to the sender that the receiver acknowledges data stored in the dual port RAM is considered as being stored after the initialization process. At step 172, the receiver determines if the INIT_STATUS memory location has a value of DPR_READY. If the INIT_STATUS is not in the DPR_READY mode, the receiver goes directly to steps 184 and 186. At this point, the INIT_STATUS memory does not contain any valid value. The receiver immediately uses default values and sets the DPR_OK flag to a logical zero when such condition is detected.

If the INIT_STATUS memory location is in the DPR_READY mode at step 172, the receiver presumes that data stored in the dual port RAM is valid and reads any asynchronous data from the dual port RAM at step 174. After reading the asynchronous data, the receiver determines if any write flags corresponding to synchronous data blocks are set at a logical one at step 176. If the write flag is set at a logical one, the receiver reads synchronous data from the dual port RAM at step 178. The receiver then sets the write flag corresponding to the synchronous data block to a logical zero at step 180. This allows the sender to know that the receiver has read data stored in the dual port RAM, and that it is now safe to send new data to the memory location. By clearing the write flag each time data is retrieved from the dual port RAM, it also allows the receiver to detect a new write to the dual port RAM location. Subsequently, the receiver sets the DPR_OK flag to a logical one at step 182. After completion of data retrieval, the receiver returns to step 150 and starts a new run. If the write flag corresponding to the synchronous data block is set at a logical zero at step 176, the receiver skips steps 178 and 180, and goes directly to step 182. At this step, the receiver sets the DPR_OK flag to a logical one at step 182 and returns to step 150 for a new run.

The present invention, thus, provides the indicator mechanism that allows to determine the validity of data communicated between two microprocessors using the dual port RAM. By monitoring various initialization and operational statuses of the sender, the present invention provides an indicator mechanism that ensures fast and accurate communication with the use of the dual port RAM.

For illustration purposes, the present invention is presented in the context of a vehicle communication circuit which allows for information exchange between engine and transmission cores operating on each side of the dual port RAM. However, it should be understood that the present invention may be applied to any system that requires information to be communicated between two digital cores with dual port RAM. In addition, it will be apparent to those skilled in the art that various modifications and adaptations can be made to the present invention without departing from the spirit and scope of the invention. Thus, it is intended that the present invention covers the modifications and adaptations of this invention, provided they come within the scope of the appended claims and their equivalents.

What is claimed is:

1. An indicator mechanism for determining the validity of information communicated between two microprocessors using a dual port random access memory (RAM), comprising:

a sender for providing a data signal;

a dual port RAM for receiving said data signal from said sender, said sender writing said data signal to a first memory location in said dual port RAM and an initialization status of said sender to a second memory location of said dual port RAM; and a receiver for reading said initialization status of said sender from said second memory location of said dual port RAM, where said receiver subsequently reads said data signal from said first memory location of said dual port RAM in association with said initialization status of said sender.

2. The mechanism of claim 1 wherein said initialization status is at least one of:

a prior-to-initialization state representing a state of said sender prior to an initialization of said dual port RAM;

an initialization-in-progress state representing a state of said sender being in progress of the initialization of said dual port RAM;

an initialization-complete state representing a state of said sender having completed the initialization of said dual port RAM; and a power-down state representing a state of said sender being in power-down mode.

3. The mechanism of claim 2 wherein said receiver reads said data signal when said initialization status is in said initialization-complete state.

4. The mechanism of claim 2 wherein said receiver uses a default value when said initialization status is in at least one of said prior-to-initialization state, said initialization-in-progress state and said power-down state.

5. The mechanism of claim 1 wherein said dual port RAM is provided within a controller, wherein said controller provides synchronous and asynchronous data transfer between an engine digital core and a transmission digital core of a vehicle.

6. The mechanism of claim 5 wherein said dual port RAM further comprises a first side adapted to control data transfer from said engine digital core to said transmission digital core of said vehicle, wherein said sender is said engine digital core and said receiver is said transmission digital core.

7. The mechanism of claim 5 wherein said dual port RAM further comprises a first side adapted to control data transfer from said transmission digital core to said engine digital core of said vehicle, wherein said sender is said transmission digital core and said receiver is said engine digital core.

8. An apparatus for determining the validity of a data signal communicated between two microprocessors by a dual port random access memory (RAM), comprising:

a sender for providing a data signal and an initialization status indicator;

a dual port RAM in communication with said sender for receiving said data signal and said initialization status indicator, said dual port RAM having a first memory location for storing said data signal and a second memory location for storing said initialization status indicator of said dual port RAM;

said sender performing initialization on said dual port RAM at a beginning of a data transfer cycle, wherein said data transfer cycle includes a plurality of data transfers from said sender to a receiver, said sender updating said initialization status indicator as said initialization progresses; and said receiver in communication with said sender from wherein said receiver reads an initialization status of said sender from said second memory location, said receiver subsequently reading said data signal from said first memory location in association with said initialization status of said sender.

9. The apparatus of claim 8 wherein said initialization status is at least one of:
   a prior-to-initialization state representing a state of said sender being prior to an initialization of said sender;
   an initialization-in-progress state representing a state of said sender being in progress of the initialization of said sender;
   an initialization-complete state representing a state of said sender having completed the initialization of said sender; and
   a power-down state representing a state of said sender being in power-down mode.

10. The apparatus of claim 9 wherein said receiver reads said data signal when said initialization status is in said initialization-complete state.

11. The apparatus of claim 9 wherein said receiver uses a default value when said initialization status is in at least one of said prior-to-initialization state, said initialization-in-progress state and said power-down state.

12. The apparatus of claim 8 wherein said dual port RAM is provided within a controller, wherein said controller provides synchronous and asynchronous data transfer between an engine digital core and a transmission digital core of a vehicle.

13. The apparatus of claim 12 wherein said dual port RAM further comprises a first side adapted to control data transfer from said engine digital core to said transmission digital core of said vehicle, wherein said sender is said engine digital core and said receiver is said transmission digital core.

14. The apparatus of claim 12 wherein said dual port RAM further comprises a first side adapted to control data transfer from said transmission digital core to said engine digital core of said vehicle, wherein said sender is said transmission digital core and said receiver is said engine digital core.

15. A method of determining the validity of information communicated between two microprocessors using a dual port random access memory (RAM), comprising:
   performing initialization on a dual port RAM by a sender at the beginning of a data transfer cycle, wherein said data transfer cycle includes a plurality of data transfers from said sender to a receiver;
   simultaneously writing an initialization status by said sender to a first memory location of said dual port RAM, wherein said initialization status includes at least one of a prior-to-initialization state indicative of said sender being prior to an initialization of said sender, an initialization-in-progress state indicative of said sender being in progress of the initialization of said sender, an initialization-complete state indicative of said sender having completed the initialization of said sender, and a power-down state indicative of said sender being in power-down mode;
   writing a data signal to a second memory location of said dual port RAM by said sender after the step of performing initialization;
   reading said initialization status from said first memory location of said dual port RAM by a receiver, wherein said receiver is in communication with said dual port RAM; and
   reading said data signal from said second memory location of said dual port RAM by said receiver when said initialization status is in said initialization-complete state, said receiver using a default value when said initialization status is in at least one of said prior-to-initialization state, said initialization-in-progress state and said power-down state.

16. The method of claim 15 wherein said dual port RAM is provided within a controller which provides synchronous and asynchronous data transfer between an engine digital core and a transmission digital core of a vehicle.

17. The method of claim 16 wherein said dual port RAM further comprises a first side adapted to control data transfer from said engine digital core to said transmission digital core of said vehicle, wherein said sender is said engine digital core and said receiver is said transmission digital core.

18. The method of claim 16 wherein said dual port RAM further comprises a first side adapted to control data transfer from said transmission digital core to said engine digital core of said vehicle, wherein said sender is said transmission digital core and said receiver is said engine digital core.

* * * * *